Sept. 15, 1970 T. L. BOWERS 3,529,097

HOMOGENEOUS MATRIX SWITCHING NETWORK

Original Filed July 24, 1964 5 Sheets-Sheet 1

INVENTOR

T. L. BOWERS

BY O. O. Warner

ATTORNEY

HOMOGENEOUS MATRIX SWITCHING NETWORK

Original Filed July 24, 1964

5 Sheets-Sheet 2

Sept. 15, 1970 T. L. BOWERS 3,529,097

HOMOGENEOUS MATRIX SWITCHING NETWORK

Original Filed July 24, 1964 5 Sheets-Sheet 3

3,529,097

HOMOGENEOUS MATRIX SWITCHING NETWORK

Theron L. Bowers, Western Springs, Ill., assignor to International Telephone and Telegraph Corporation, New York, N.Y., a corporation of Delaware Original application July 24, 1964, Ser. No. 384,909, now Patent No. 3,400,220, dated Sept. 3, 1968. Divided and this application Apr. 16, 1968, Ser. No. 738,751
Int. Cl. H04q 3/42
U.S. Cl. 179—18 7 Claims

ABSTRACT OF THE DISCLOSURE

A plurality of small cascaded matrices are assembled into a switching network. The crosspoints of the first stage matrices are distributed in a manner which produces a homogeneous outflow of traffic from that stage despite the fact that the traffic input into that stage is not homogeneous. The crosspoints of the second stage are distributed in a manner which preserves the homogeneous traffic flow throughout the network.

Figure 1:
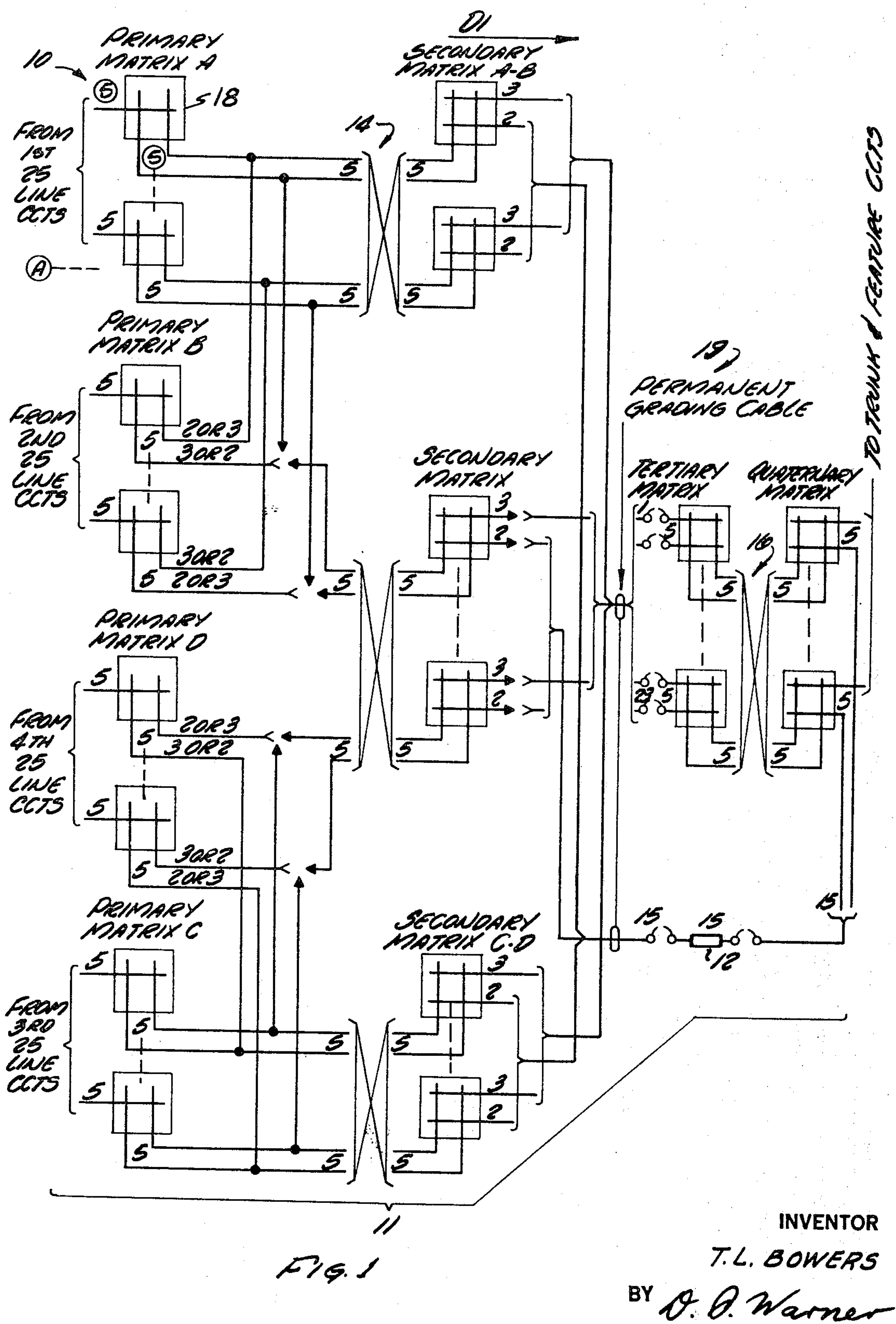

This is a division of 384,909 filed July 24, 1964 now Pat. 3,400,220, granted Sept. 3, 1968, and assigned to the assignee of this invention.

The invention relates to multi-stage crosspoint switching networks and more particularly—although not exclusively—to networks designed for use in telephone switching systems.

A "switching network" is a device for selectively extending electrical paths from any inlet to any outlet. Each path is extended through the network by way of a number of switching components commonly called "crosspoints." Since these crosspoints are the most numerous items in the switching network, an increase in efficiency of crosspoint usage offers perhaps the most fertile field for cost reduction. Moreover, it should be possible to install a system having a small number of crosspoints which may be economically enlarged by small additions to become a system having a large number of crosspoints while maintaining a uniform crosspoint efficiency. This enlargement should be made in a manner such that the original basic network configuration does not change.

Traditionally, switching networks have used devices which do not permit the most efficient use of crosspoints. For example, a truly efficient use of crosspoints might require very small switches and many switching stages. However, if this were done, when using electromechanical switching components such as a crossbar switch, it would require an excessive number of magnets and control circuitry. The magnets and control circuits—not the crosspoints—are the criteria controlling of network cost. These prior electromechanical switches cannot economically be reduced to the small size that is desired for crosspoint efficiency. Nor is it economically feasible to vary the capacity of switches after production tooling is acquired. Hence, in the past, a network designer has been prevented from doing very much to increase efficiency of the crosspoint.

With the advent of modern types of crosspoint switches and crosspoint matrices, the designer has been freed from the necessity for using large, inflexible standard size switching units. For example, matrices employing glass-reed or semiconductor crosspoints may be made larger or smaller by the simple expedient of adding or subtracting crosspoints to an arrangement of any convenient geometrical pattern. In particular, some recently developed electronic switching systems utilize semiconductor crosspoints having the ability to select a path through the network by themselves. This means that extensive innetwork crosspoint controls are no longer required. Hence, the efficiency of crosspoint usage has finally become the basic criterion of network cost and one of the keys to achieving maximum cost reduction for an entire switching system.

When switching networks are designed to use a plurality of matrices having an optimum number of inlets and outlets, the individual matrix tends to be quite small (such as five to ten inlets, for example). Unfortunately, however, when the matrices become this small, the traffic through any one matrix no longer tends to be a true statistical sample of the whole traffic load. Some of the matrices may become saturated with excess traffic while others may lie idle.

If this traffic unbalance occurs, many of the savings of an efficiently sized matrix are lost due to a lack of homogeneity in traffic distribution.

Accordingly, an object of this invention is to provide new and improved multistage switching networks. More particularly, an object of the invention is to provide new and improved electronic or glass reed switching matrices. In this connection, an object is to increase the efficiency of individual crosspoints. Here, an object is to provide switching networks having homogeneous traffic patterns.

In accordance with one aspect of this invention, these and other objects are accomplished by a switching network comprised of a plurality of cascaded switching stages. Each stage includes a number of matrices. Each inlet in a matrix "sees" a uniform number of outlets which are different from the combination of outlets seen by any other inlet in that stage. Thus, no two inlets in any matrix are offered the opportunity to complete any connection over exactly the same group of outlets. This means that, even though these matrices are small in size, the traffic out of the matrix displays the distribution characteristics of a much larger random sample. The traffic leaving the stage is as homogeneous as it would be if the individual matrices were large.

Figure 2:
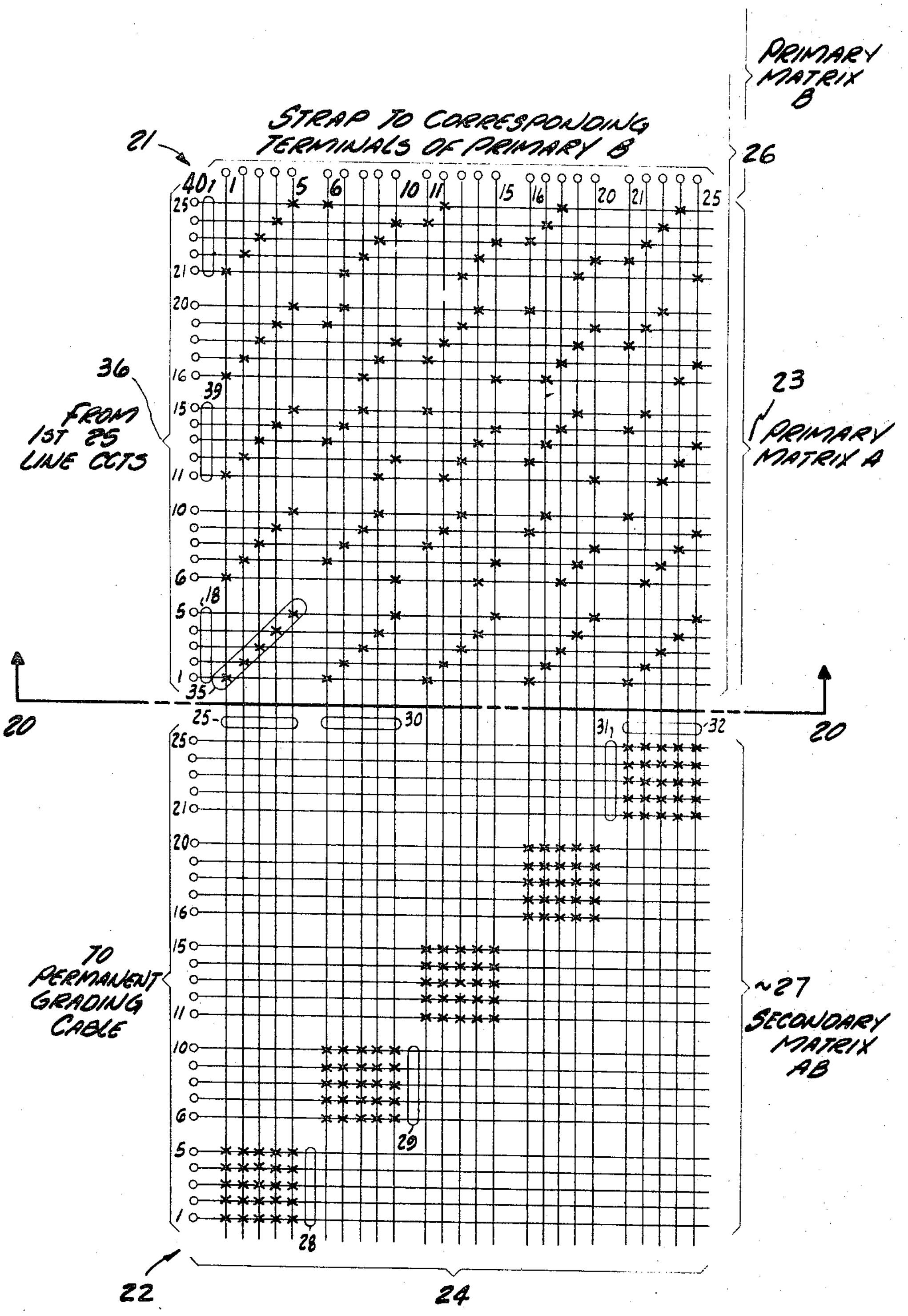
Figure 3:
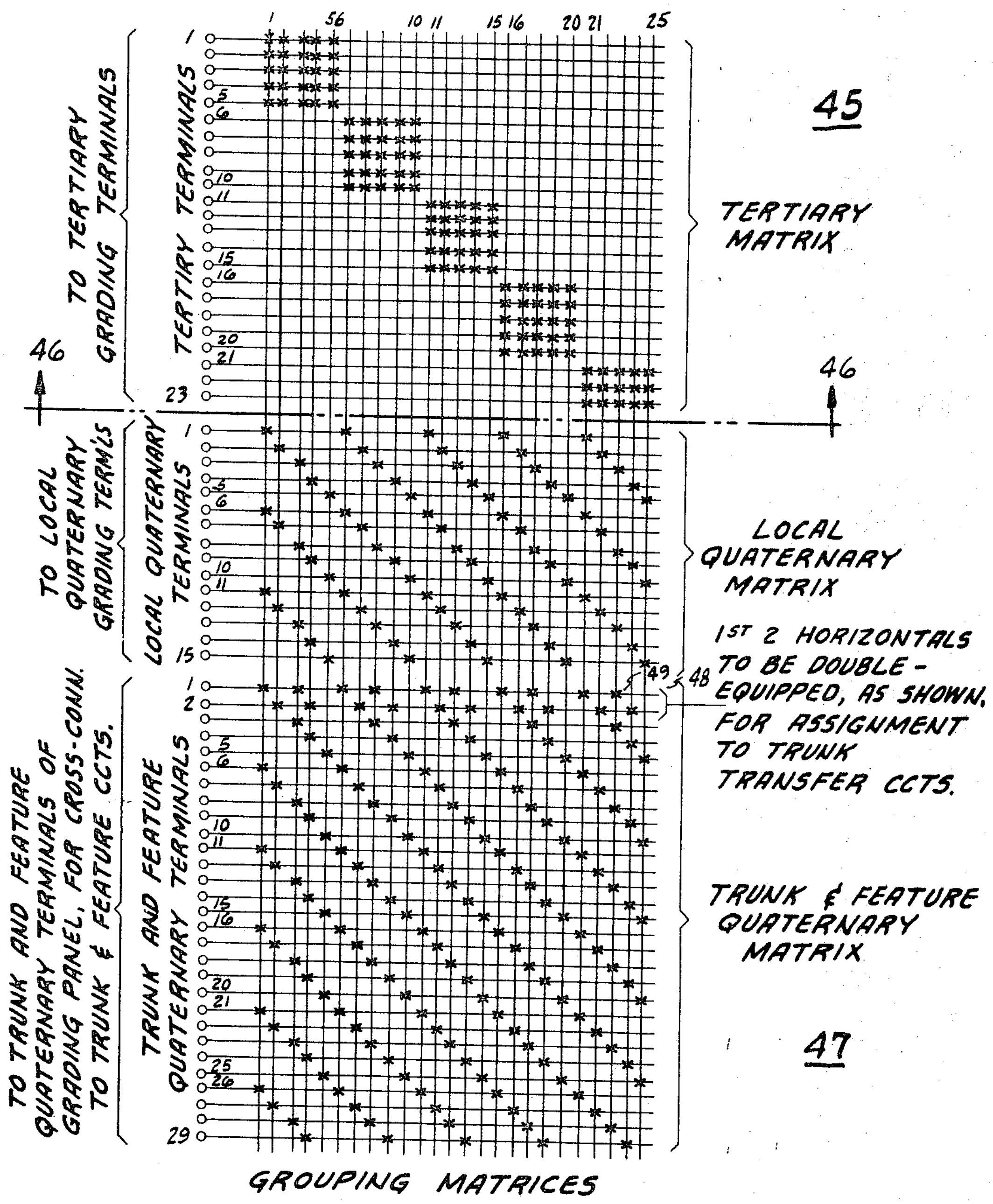
Figure 4:
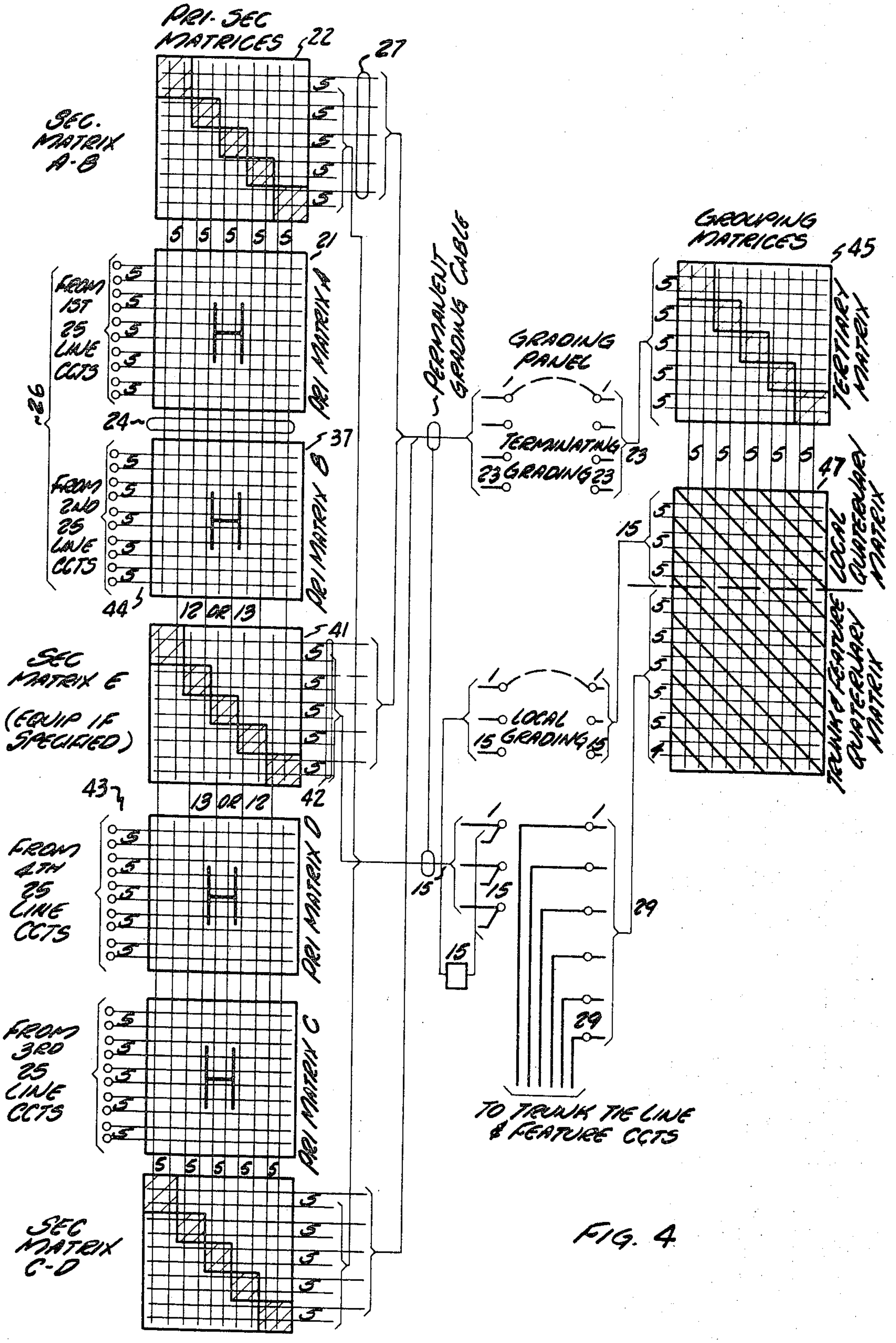
Figure 5:
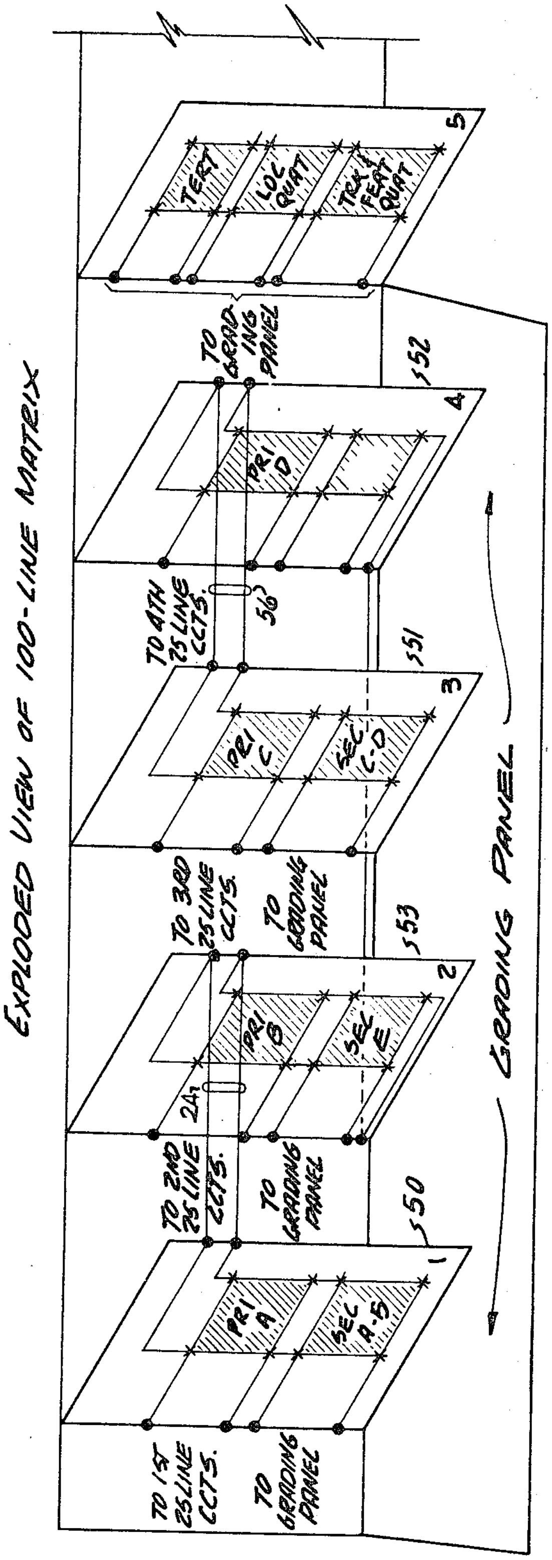

The above mentioned and other features of this invention and the manner of obtaining them will become more apparent, and the invention itself will be best understood by reference to the following description of an embodiment of the invention taken in conjunction with the accompanying drawings, in which:

FIG. 1 is a block diagram which schematically shows a network having a number of cascaded switching stages;

FIG. 2 symbolically shows the placement of crosspoints in two cascaded matrices, arranged to provide homogeneous traffic patterns;

FIG. 3 symbolically shows the placement of crosspoints in two matrices which are at the end of the network;

FIG. 4 is a graphical disclosure which explains how to arrange the matrices of FIG. 2 to form a complete network; and FIG. 5 is an exploded view showing of how the physical arrangement of printed circuit cards might look if it provides the electrical circuitry of FIG. 4

FIG. 1 is a block diagram which explains how traffic is either concentrated or expanded in a switching network. This disclosure is intended to be generic so that it may be applied to any type of switching system. That is, many things on the right are connected to a few things on the left. However, by way of example, the connections may be thought of as telephone calls progressing (in the direction of the arrow D1). One such call may be extended from a calling subscriber line A which is connected via a line circuit (not shown) at inlets 10, through a plurality of cascaded switching stages 11, to a link or control circuit 12. The purpose of the cascaded stages 11 is to concentrate the traffic when connections are extended from calling lines to links or to expand the traffic when connections are extended from calling lines to links or to expand the traffic when connections are extended to called line from the links.

It should be clear that most of the network crosspoints are located in the left-hand stage or "Primary Matrix" which is adjacent the subscriber lines. Since no one subscriber normally uses his telephone more than a small fraction of the total day. It should also be clear that this is the part of the network where the traffic is least dense. On the other hand, the least number of crosspoints are in the right-hand stage adjacent the link circuit 12 where the traffic is most dense. It should now be clear that one way to effect a substantial economy is to reduce the number of crosspoints in the primary stage relatively to the number of crosspoints in the secondary stage without losing switching efficiency. Another way is to construct the network secondary in a manner such that it may be enlarged incrementally to serve increased traffic without requiring any substantial change in existing switching networks. This feature of the invention is an interstage wiring technique symbolically shown at 14 and 16, in FIG. 1.

To give a concrete illustration, it is arbitrarily assumed that one hundred subscriber lines are served by the network of FIG. 1. Each subscriber line (such as A) is connected to a single inlet or horizontal in a primary matrix. Each matrix is formed from a number of sub-groups of inlets. A first sub-group is shown at 18 as having five inlets, as indicated by the numeral 5 which appears just above a horizontal line. Each such sub-group has access to five outlets as indicated by the nummeral 5 between two vertical lines. (For easy finding, these two numerals are encircled at the primary matrix). The numeral 15 (shown above the box 12) indicates that fifteen originating junctors serve the hundred inlets 10.

The notation "To Trunk and Feature CCTS" in intended as a generic disclosure that any suitable equipment may be reached via the switching network.

Under the present assumptions, the one hundred subscriber lines 10 have access to fifteen junctors 12. If, as is conventional, certain lines can reach only certain junctors, there could be a serious imbalance of traffic where some routes are always rejecting or blocking calls because of all-busy conditions despite the fact that other routes are not used sufficiently. Therefore, a wiring or distribution panel is used to distribute traffic, as indicated at 19. At this point, outlet terminals from the "Secondary" stage are jumpered to inlet terminals of either the "Tertiary" stage or the junctors 12 in a manner which makes the traffic more homogeneous.

According to the invention, every primary and secondary matrix contains the same number of crosspoints independent of the traffic density through these stages. The total crosspoint arrangement of each primary stage matrix is distributed to provide homogeneity. Therefore, a number of standard types of printed circuit cards may be assembled to provide a switching network that serves a system having a minimum traffic density. As traffic increases, the same types of printed circuit cards may be added to expand capacity incrementally. Therefore, the system may be increased to become a maximum traffic density system without requiring anything except more of the same standard type of cards. This increases the switching capabilities and reduces the cost of the entire crosspoint network—and particularly the cost of the primary stage, where crosspoints are most numerous.

FIG. 2 suggests how the crosspoints are distributed in the various matrices. The invention allows many patterns; this particular pattern merely explains the inventive principle. Those skilled in the art are expected to select a pattern which best serves their needs. The reader may orient FIGS. 1 and 2 by comparing the notations "From 1st 25 line circuits, "Primary Matrix A, "Permanent Grading Cable, and "Secondary Matrix AB. Also, for convenience of expression, the upper matrix (above dot-dashed line 20) is called a "homogeneous" matrix. The lower matrix below the line 20 is a secondary matrix. In FIG. 4 these homogeneous matrices are identified by the letter H, as at 21, and the secondary matrix by a staircase design, as at 22.

The network 11 of FIG. 1 comprises a plurality of cascaded switching stages (i.e. a primary stage, a secondary stage, a tertiary stage, etc.), each stage including a number of relatively small matrices, two of which are shown in FIG. 2 (i.e. Primary Matrix A and Secondary Matrix AB). Each matrix comprises a grid pattern formed by two sets (horizontal and vertical) of conductors oriented so that one set extends perpendicularly to the other set thereby forming a number of intersections. One set (horizontal) of these conductors forms inlets to the matrix, and the other set (vertical) form outlets from the matrix. Crosspoint means, of any suitable design, are coupled across the conductors at selected intersections for electrically joining the conductors at that intersection when the crosspoint is closed and isolating the conductors when the crosspoint is open. Preferably these crosspoints are devices such as PNPN diodes or reed switches. These crosspoints are distributed throughout the matrices to provide homogeneous traffic patterns wherein every matrix inlet "sees" the same number of outlets but no two inlets have more than one outlet in common.

Preferably, a single type of printed circuit card, having a uniform pattern of horizontal and vertical conductors, is used for all matrices. In FIG. 2, an X mark indicates the presence of a crosspoint switching element. These crosspoint elements are mounted on the board at locations selected to produce either the homogeneously mixed traffic of the primary matrix or the grouped traffic of the secondary matrix.

To provide the arbitrarily selected hundred line network, the exemplary construction could be arranged in the manner described below. Those skilled in the art will readily perceive how to change the arrangement to make a network of a different size.

FIG. 2 incorporates a two-stage primary-secondary switching configuration. Each stage is shown by a matrix having twenty-five horizontal or inlets 23 and verticals or outlets 24. The conductors in each set (horizontal and vertical) are divided into sub-groups (e.g., a sub-group of five horizontals is shown at 15 and a sub-group of five verticals is shown at 25). The crosspoints are distributed across these and other sub-groups in the network so that no inlet in any sub-group shares its outlets with any other inlet in the same sub-group.

An equivalent of ten 5 x 5 coordinates primary matrices 26 and five 5 x 5 associated secondary matrices 22 is obtained by the use of three 23 x 23 grid patterns (as shown in FIG. 4). On these primary matrices 26, one-hundred-twenty-five switching crosspoints are placed at selected intersections of each grid to produce a true link-type, two-stage network configuration. The twenty-five verticals 24 of the three grids extend in a straight line through all the grid patterns, without transposition of any kind. The fifty horizontals 28 of the two primary matrix grids serve as inlets and the twenty-five horizontals 27 of the secondary grid serve as outlets of the two-stage network.

The one-hundred-twenty-five crosspoints of each of the two primary matrices grids are arranged to permit each of the twenty-five per grid horizontals inlets to be switched to one particular vertical outlet in each of the five sub-groups of verticals 1–5, 6–10, etc. to 21–25.

The one-hundred-twenty-five crosspoints of the secondary matrix grid 22 are also arranged in five groups of 5 x 5. This network, however, uses a staircase pattern of crosspoint placement because all traffic leaving the primary matrix is homogeneous owing to the arrangement of crosspoints in that matrix. Thus, a first sub-group 28 (horizontals 1 to 5) may be switched to any of a first sub-group 25 (verticals 1–5). A second sub-group 29 of horizontals may be switched to any of a second sub-group 30 of verticals, and so on. The last group 31 of five horizontals, may be switched to any of last group 32 of verticals.

In greater detail, it should be apparent from an inspection of FIG. 2 that the set of five crosspoints 35 allows each of the primary matrix horizontals 1–5 in sub-group 18 to reach a particular one of the verticals 1–5 in subgroup 25. In like manner, every other set of five crosspoints in horizontals 1–5 in subgroup 18 allows access to a complete sub-group of verticals. The same is true for every other sub-group of horizontals. Hence, every sub-group of horizontals "sees" every one of the verticals. A further characteristic of the crosspoint component placements is that each of the twenty-five inlets 36 has access, via its five sets of crosspoints, to a uniquely different combination of five verticals. For example, by inspection of the matrix 21 (FIG. 2), it is seen that horizontal 1 has access to verticals 1, 6, 11, 16, 21. Horizontal 2 has access to verticals 2, 7, 12, 17, 22. Horizontal 25 has access to verticals 5, 6, 12, 18, 24. All intermediate horizontals have access to a similar combination of verticals which can be read off FIG. 2. None of these combinations are the same. This gives the grid the following special properties:

(1) No inlet in any fives or sub-group of horizontals 1–5, 6–10, . . . 21–25 shares its outer verticals with any other inlet in the same fives or sub-group. Incidentally, this requires that all twenty-five verticals be accessible to one or another of the five lines in each horizontal fives or sub-group.

(2) No two horizontal inlets within the same primary matrix grid may share access to more than one outlet vertical. For example, the first horizontal or inlet 1 has access to verticals 1, 6, 11, 16, 21. Vertical 1 is shared by horizontal inlets 6, 11, 16, 21. But, horizontal inlet 1 does not share verticals 6, 11, 16, 21 with any of these inlets. In like manner, horizontal inlet 1 shares vertical 6 with horizontal inlets 7, 13, 19, 25. But horizontal inlet 1 does not share verticals 1, 11, 16, 21 with any of these horizontals. By inspection, it should be obvious that no other horizontal shares more than one vertical with any horizontal. Thus, the five verticals accessed by any inlet of any one group of five inlets will be shared by all twenty lines in the other four horizontal groups of inlets.

In FIG. 4, it is apparent that two homogeneous primary matrices 21, 37 are served by the same verticals. Thus a total of fifty inlets are served by a total of twenty-five outlets. We have just examined how a sub-group of horizontal inlets "see" the vertical outlets.

In keeping with an aspect of the invention, every horizontal inlet shares its traffic with a maximum number of other inlets. This distributes the outlets over the maximum number of crosspoints. In greater detail, consider a specific example of how the traffic is shared with respect to horizontal inlet 1 in sub-group 16. Horizontal 1 can "see" vertical outlets 1, 6, 11, 16, 21. However, none of these verticals are "seen" by horizontal inlets 2–5. Thus, there is no way for horizontal 1 to see the other horizontals in its own group (e.g. horizontal 1 shares no traffic burdens with horizontal 2 because horizontal 2 "sees" only the verticals 2, 7, 12, 17, 22). However, on vertical 1, horizontal 1 shares the traffic burden with horizontals 6, 11, 16, 21. On vertical 6, horizontal 1 shares the traffic burden with horizontals 7, 13, 19, 25. On vertical 11, it shares the traffic burden with horizontals 3, 13, 17, 24. By a similar analysis, it is found that the horizontal inlet 1 shares the traffic burden with each of the twenty horizontal inlets 6–25. The horizontal inlet 1, which we have just discussed, also shares its traffic burdens with the corresponding twenty horizontal inlets in the matrix 37 (FIG. 4). In addition, it shares the traffic burdens of the horizontal inlet in the 1 position in matrix 37. Stated another way, horizontal inlet 1 of matrix 21 shares its traffic burden with forty-one other horizontal inlets. The same is true of every other horizontal inlet in the homogeneous matrices.

(3) This pattern of crosspoint placements thus provides a completely homogeneous primary grid for a 5 x 5 matrix, by insuring that every horizontal inlet shares its vertical outlets to the maximum extent with the other lines of its system.

(4) This primary and secondary crosspoint placement also insures that every inlet has access to every one of the twenty-five secondary outlets 23 via a system of non-transposed vertical links which share the traffic equally from every horizontal sub-group in the system.

An advantage of this array is that a homogeneous traffic pattern remains even if some of the inlets are left unequipped. For example, the primary matrices 21, 37 serve fifty lines. Suppose that only forty lines are required. It is only necessary to omit any two sub-groups, each of five horizontals, in either or both of the matrices 21, 37. This could be the fives sub-groups 39, 40 (FIG. 2); or it could be any other sub-group. Actually, very little homogeneity would be lost if any arbitrarily selected horizontals are omitted at random. However, a judicious omission of a specifically selected group of individual horizontals could bring an unfavorable redistribution of traffic. Hence, omissions should be made by sub-groups.

The invention thus provides a network in which the traffic is uniquely smooth to and through the secondary inlets and outlets. Or, stated another way, the traffic is equalized over all the outlets and interstage links despite any serious unbalances which may exist in the loading of individual inlets at the primary matrices. The degree of blocking which may be encountered in this network, for a given averages inlet loading, is less than the blocking for any other type of primary-secondary (2-stage) configuration having a like number of inlets, interstage links, outlets, and link access per inlet.

It is obvious that for any given allowable degree of traffic blocking in the network, a certain maximum average loading per line must not be exceeded. If higher traffic loads must be imposed, an additional secondary grid may be added to the above-described network. As seen in FIG. 4, the added secondary matrix 41 is inserted by extending all or a portion of the verticals in each vertical sub-group to the corresponding verticals of the added secondary grid 41. The crosspoint placement in this second secondary grid corresponds to those in the original secondary, except that any unextended verticals are not equipped with crosspoints. Twenty-five additional output horizontals are thus obtained at 42. If no more than 50% of the total verticals have to be extended to the second secondary to obtain the required increase in traffic handling capacity, the same extra second secondary may also be used to serve a second fifty line switching unit 43. Alternate numbered verticals from the two units 43, 44 are then extended from each unit to alternate verticals of the new secondary grid 41.

If still more traffic capacity is required, each fifty-inlet network has its own additional secondary grid, having verticals connected up to 100% of the existing network verticals.

An advantage of this arrangement is that the extremely smooth flow of traffic from the secondary outlets allows the use of a standard type of secondary matrix grid in many network positions. For example, the same type of grid is used for both the secondary matrices 22, 41 and the tertiary matrix 45.

The cascaded matrices which form the input side of the network are those shown in FIG. 2 and on the left-hand side of FIG. 4. The matrices which form the output side of the network are those shown in FIG. 3 and on the right-hand side of FIG. 4.

A horizontal dot-dashed line 46 (FIG. 3) divides the tertiary matrix 45 from the quternary matrix 47. The grid pattern printed on the printed circuit card is essentially the same as the grid pattern already described in connection with FIG. 2 except that perhaps a few more horizontals are used. Thus, the only real difference between any of the matrices in the network is the physical placement of the crosspoints. Electrically, of course, this placement makes a big difference—physically the similarity makes for economy in manufacture.

The two final switching stages occupy a single twenty-five vertical card. The tertiary inlets (horizontals) are provided with a staircase pattern of crosspoints in a manner similar to the secondary grids, to form the tertiary matrix. The number of equipped tertiary horizontals will vary for different applications; but for the assumed one hundred line system, they will be assigned in the same fives sub-groups and in sequence. Thus, in a small system perhaps the first 5, 10, 15 sub-groups of horizontals will be equipped with crosspoints. This will, in turn, require that only the 5, 10, 15 sub-groups of verticals will be equipped. For larger systems, up to a total of twenty-five verticals may be equipped.

The remaining (i.e below line 46) horizontals on the card serve as outlets to various destinations, such as trunks and the terminating side of local junctors. Each such horizontal is provided with one crosspoint per five equipped verticals, to form the quaternary matrix. The crosspoint assignments are staggered progressively on successive quaternary horizontals to form a pattern having the properties of a "slipped multiple."

Thus every tertiary inlet has access to a group of five verticals via one or another of which it can "see" all the equipped quaternary outlets. There is one particular vertical by which a particular tertiary inlet may be connected to a particuular quaternary outlet. This is true regardless of the full or partial extents to which both the tertiary inlets and quaternary outlets may be equipped in any specific application.

Stated another way, suppose that traffic is such that only the tertiary inlets 1–10 are equipped with crosspoints placed in the first two steps of the staircase pattern. Under this assumption, only the crosspoints in the first ten verticals 1–10 are provided in the quaternary matrix below the line 46. Suppose next, that traffic increases so that more capacity is required. It is only necessary to "repair" the board by adding the crosspoints required to complete the third step in the staircase pattern (horizontals 11–15 in the tertiary matrix) and to equip the corresponding verticals 11–15 in the quaternary matrix. In this manner, virtually any switching capacity may be supplied with almost no change in the grade of service.

Next suppose that either a mistake is made in the traffic study or that special conditions exist to change the grade of service requirements. It is only necessary to "repair" the board by adding more crosspoints in the quaternary matrix. This is illustrated at 48 in FIG. 3. Here, it is assumed that an outlet leads from the quaternary matrix to a "call transfer" circuit. Assume that the grade of service gives one chance in a hundred that a normal call will fail to find its way through the network. No real harm is done if the call is lost; the calling party receives busy tone and tries again to complete the call at a later time. Next assume that a call transfer takes place. A calling subscriber reaches a called subscriber. It is then learned that the called subscriber must transfer the call to a third telephone. No one would be very happy if the connection is released and this transfer failed to be completed because it happened to be the one call in a hundred which falls under the assumed grade of service. Thus, a greater grade of service must be given to these transfer calls to decrease the chance for failure. This greater grade of service is provided by adding extra crosspoints (as shown at 40, for example).

The point is that almost any grade of service may be provided by adding crosspoints. Furthermore, these crosspoints may be added as the system grows without disturbing the existing traffic patterns.

FIG. 5 shows an exploded view of how this printed circuit cards may look physically when a switching network is assembled according to the electrical teaching of FIG. 4. Each of the cards 50, 51 is equipped to provide the electrical circuitry shown in FIG. 2. Card 52 provides a second homogeneous primary matrix D feeding via connectors 56 into primary matrix C in a manner which is obvious from an inspection of FIG. 4. Likewise, card 53 provides a primary matrix B which feeds via conductors 24 into primary matrix A. To provide added secondary matrix capacity, card 53 may also carry an optical secondary matrix E which is shared by all primary matrices, again as shown in FIG. 4. Vertical extension from primary matrix B to verticals of secondary matrix E are made by the usual printed circuit techniques on card 53. An inspection of FIG. 4 shows, however, that secondary matrix E is connected not only to primary matrix B but also to primary matrix D. This means that much special cabling might be required between cards 52, 53, and cabling is expensive. On the other hand, almost any pattern may be printed on a printed circuit card with no change in cost. Thus, it costs nothing to print a grid pattern on card 52 which may be equipped to serve as half of the secondary matrix E while the grid pattern on card 53 serves as the other half of the secondary matrix. If the pattern corresponds to FIG. 4, the even numbered verticals in the secondary matrix E of card 53 are equipped with crosspoints. The odd numbered verticals in the secondary matrix E of card 52 are equipped with crosspoints. The cabling between all cards is uniform—no special wiring is required.

The advantages of this arrangement are that all of the printed circuit cards may have exactly the same printed grid pattern. Only the crosspoint placement will vary.

While the principles of the invention have been described above in connection with specific apparatus and applications, it is to be understood that this description is made only by way of example and not as a limitation on the scope of the invention.

I claim:

1. A switching network comprising a plurality of small matrices of discrete crosspoints, each matrix having inlets and outlets, said matrices being arranged in cascaded stages with network inlets connected to a first of said cascaded stages and network outlets connected to a last of said cascaded stages, said crosspoints being uniformly distributed throughout the first stage for uniformly distributing traffic from the inlets of the first stage to the inlets of the second stage in said cascade, and said crosspoints being distributed in said second stage for maintaining said uniform distribution of traffic to the outlets of said second stage.

2. A switching network comprising a plurality of small matrices of discrete crosspoints, each matrix having inlets and outlets, said matrices being arranged in cascaded stages with network inlets connected to a first of said cascaded stages and network outlets connected to a last of said cascaded stages, said crosspoints being uniformly distributed throughout the first stage for uniformly distributing traffic from the inlets of the first stage to the inlets of the second stage in said cascade, means in said second stage for maintaining said uniform distribution of traffic to the outlets of said second stage, wherein said first stage comprises a first plurality of said small matrices having discretely grouped inlets and uniformly intermixed outlets, there being one discrete group of inlets for each first stage matrix, and effectively one outlet group from all of said first plurality of matrices, said one outlet group having uniformly mixed paths extending from said discrete groups of inlets to said outlet.

3. The network of claim 2 wherein said second stage comprises a second plurality of said small matrices having a plurality of discretely grouped inlets and outlets maintained in the same discrete groupings throughout said second stage.

4. A switching network of discrete crosspoints at least part of which are mounted on a printed circuit card, said printed circuit card having a first plurality of conductors leading to inlets of said card and a second plurality of conductors leading to outlets of said card, and a third group of conductors forming conductive busses on said card and crossing said first and second plurality of conductors to provide crosspoint positions at each crossing, said printed circuit card being equipped with first and second groups of crosspoint switches which are fewer in number than the total number of crosspoint positions on said card, said first group of crosspoint switches being at selected locations which uniformly distribute said inlets across a plurality of groups of said conductive busses, and said second group of crosspoints being at selected locations which do not distribute said groups of conductive busses across said outlets but which do maintain the grouping of said busses at said outlets.

5. A switching network comprising first and second cascaded stages, said first stage having a plurality of inlets I and a number of outlets N arranged in a number of groups M, said first stage further comprising a plurality of 1 x M matrices, each of said 1 x M matrices being individually associated with one of said inlets, the M number of outlets of said 1 x M matrices being uniquely and evenly distributed throughout said N number of outlets, there being one outlet from each 1 x M matrix in each of the M number of groups.

6. A switching network comprising first and second cascaded stages, said first stage having a plurality of inlets I and a number of outlets N arranged in a number of groups M said first stage further comprising a plurality of 1 x M matrices, each of said 1 x M matrices being individually associated with one of said inlets, the M number of outlets of said 1 x M matrices being uniquely and evenly distributed throughout said N number of outlets, there being one outlet from each 1 x M matrix in each of the M number of groups, wherein said second stage includes N number of inlets and M number of directional switching matrices, the inlets of each directional matrix being connected to an individually associated one of the M number groups of outlets from said first stage.

7. The method of traffic equalization for switching networks comprising a plurality of very small matrices of discrete crosspoints, said method including the steps of:

(a) connecting groups of lines to the inlets of certain of a first plurality of said small crosspoints matrices, (b) equipping selected crosspoint locations with switches in said first plurality of matrices, said selected locations being distributed with a uniform distribution so that each line inlet has access to the same number of outlets with no two inlets in any first small matrix sharing its outlets with any other inlet in the same small matrix, (c) cross-connecting the outlets of said first plurality of small matrices to the inlets of a second plurality of said small matrices so that there is only one path from an outlet of each matrix in said second plurality with no one of said first plurality of matrices sharing a greater number of said cross connections to any one of said second plurality than any other first plurality shares, and (d) keeping all traffic directed into any of said second plurality of matrices segregated from all traffic in any other of said second plurality of matrices.

References Cited

UNITED STATES PATENTS

| | | |
|---|---|---|
| 3,275,752 | 9/1966 | Espereth et al. |
| 3,290,558 | 12/1966 | Sapy. |

KATHLEEN H. CLAFFY, Primary Examiner

W. A. HELVESTINE, Assistant Examiner